US008444517B2

(12) United States Patent  (10) Patent No.: US 8,444,517 B2
Gradu et al.  (45) Date of Patent: May 21, 2013

(54) HYBRID TRANSMISSION

(75) Inventors: Mircea Gradu, Auburn Hills, MI (US);
Berthold Martin, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 268 days.

(21) Appl. No.: 12/914,466

(22) Filed: Oct. 28, 2010

(65) Prior Publication Data

US 2012/0108379 A1    May 3, 2012

(51) Int. Cl.
    *F16H 3/72*    (2006.01)
(52) U.S. Cl.
    USPC .......................................................... 475/5
(58) Field of Classification Search
    None
    See application file for complete search history.

(56) References Cited

U.S. PATENT DOCUMENTS

| | | | |
|---|---|---|---|
| 6,527,658 B2 * | 3/2003 | Holmes et al. ................. | 475/5 |
| 6,726,592 B2 * | 4/2004 | Kotani .............................. | 477/4 |
| 7,101,298 B2 * | 9/2006 | Sowul et al. .................... | 475/5 |
| 7,128,677 B2 * | 10/2006 | Supina et al. ................... | 475/5 |
| 7,201,690 B2 * | 4/2007 | Miura et al. .................... | 475/2 |
| 7,252,613 B2 * | 8/2007 | Bucknor et al. ................ | 475/5 |
| 7,261,661 B2 * | 8/2007 | Schmidt .......................... | 475/5 |
| 7,329,201 B2 * | 2/2008 | Raghavan et al. .......... | 475/151 |
| 7,347,798 B2 * | 3/2008 | Raghavan et al. ............ | 475/5 |
| 7,371,203 B2 * | 5/2008 | Raghavan et al. ............ | 475/5 |
| 7,387,586 B2 * | 6/2008 | Raghavan et al. ............ | 475/5 |
| 7,455,610 B2 * | 11/2008 | Kim ................................ | 475/5 |
| 7,479,081 B2 * | 1/2009 | Holmes .......................... | 475/5 |
| 7,497,797 B2 * | 3/2009 | Bucknor et al. ................ | 475/5 |
| 7,591,750 B2 * | 9/2009 | Bucknor et al. ................ | 475/5 |
| 7,611,433 B2 * | 11/2009 | Forsyth .......................... | 475/5 |
| 7,645,205 B2 * | 1/2010 | Holmes .......................... | 475/5 |
| 7,785,221 B2 * | 8/2010 | Steinwender .................. | 475/5 |
| 7,806,795 B2 * | 10/2010 | Oba et al. ....................... | 475/5 |
| 7,833,119 B2 * | 11/2010 | Klemen et al. ................. | 475/5 |
| 8,246,500 B2 * | 8/2012 | Eto et al. ........................ | 475/5 |
| 2007/0034427 A1 | 2/2007 | Janson et al. | |
| 2007/0105678 A1 | 5/2007 | Bucknor et al. | |
| 2007/0117668 A1 | 5/2007 | Sowul et al. | |
| 2008/0312022 A1 | 12/2008 | Martin et al. | |

* cited by examiner

*Primary Examiner* — Dirk Wright
(74) *Attorney, Agent, or Firm* — Frederick A. Krieger

(57) ABSTRACT

A multi-speed hybrid transmission includes a main gearset connected to a vehicle gas combustible engine and providing torque to an output shaft. The transmission also includes an electric drive unit comprising an electric motor that is selectably connectable to the output shaft to provide additional torque to the output shaft. When connected to the output shaft, the electric drive unit improves vehicle performance under certain driving conditions (e.g., high boost in low gear or in upper gears) while also improving fuel efficiency.

17 Claims, 5 Drawing Sheets

| GEAR | RATIO | CLUTCHES APPLIED | | | | |
| --- | --- | --- | --- | --- | --- | --- |
| | | UD | OD | R | 2-4 | LR |
| 1 | 2.842 | X | | | | X |
| 2 | 1.573 | X | | | X | |
| 3 | 1.000 | X | X | | | |
| 4 | 0.689 | | X | | X | |
| R | -2.214 | | | X | | X |

FIG. 2

HYBRID TRANSMISSION

FIELD

The present disclosure relates to vehicle transmissions, and more particularly to hybrid vehicle transmissions.

BACKGROUND

Conventional automatic transmissions include a torque converter that receives torque from an engine and planetary gearsets that receive torque from the torque converter. The planetary gearsets provide various gear ratios of torque and thus, various drive speeds. Transmissions also typically include fluid pressure-operated, multi-plate drive or brake clutches and/or brake bands that are connected to the individual elements of the planetary gearsets to allow shifts between the various gear ratios. In addition, automatic transmissions may also include one-way clutches (i.e., overrunning clutches) that cooperate with the multi-plate clutches to optimize power shift control. Moreover, typical transmissions include a controller for selectively applying and releasing elements to shift the gears.

An example of an advanced, modular six-speed transmission is disclosed in U.S. Patent Application Publication 2008/0312022, assigned to the assignee of the present application and incorporated herein by reference. The transmission disclosed in Publication 2008/0312022 improved vehicle performance and fuel economy with a less complex and low cost solution compared to other transmissions known in the art at that time. The present inventors, however, have realized that an improved transmission is desirable to further improve vehicle performance and increase fuel economy.

SUMMARY

In various example embodiments, the technology described herein provides a multi-speed hybrid transmission for a vehicle. The multi-speed hybrid transmission includes a main gearset connected to a gas combustible engine and providing a first set of torque to an output shaft. The transmission also includes an electric drive unit comprising an electric motor that is selectably connectable to the output shaft to provide additional torque to the output shaft. When connected to the output shaft, the electric drive unit improves vehicle performance under certain driving conditions while also improving fuel efficiency.

In one form, the present disclosure provides a hybrid transmission that includes a main gearset, an electric drive unit and a controller. The main gearset is connected to an engine via an input shaft. The main gearset includes a plurality of planetary gears and a plurality of shift elements configured to provide torque to an output shaft. The electric drive unit includes an electric motor that is selectably coupled to the output shaft to provide additional torque to the output shaft. The controller is operably associated with the main gearset and the electric drive unit to cause the transmission to transfer the torque in a first mode of operation and to couple the electric motor to the output shaft to transfer the torque plus the additional torque in a second mode of operation.

In another form, the present disclosure provides a vehicle powertrain that includes a gas combustible engine and a transmission connected to the engine via an input shaft. The transmission includes a main gearset, an electric drive unit and a controller. The main gearset is connected to the engine via the input shaft and includes a plurality of planetary gears and a plurality of shift elements configured to provide torque to an output shaft. The electric drive unit includes an electric motor that is selectably coupled to the output shaft to provide additional torque to the output shaft. The controller is operably associated with the main gearset and the electric drive unit to cause the transmission to transfer the torque in a first mode of operation and to couple the electric motor to the output shaft to transfer the torque plus the additional torque in a second mode of operation.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 2 is a table illustrating example shift sequences for the hybrid transmission disclosed herein;

DETAILED DESCRIPTION

Figure 1:
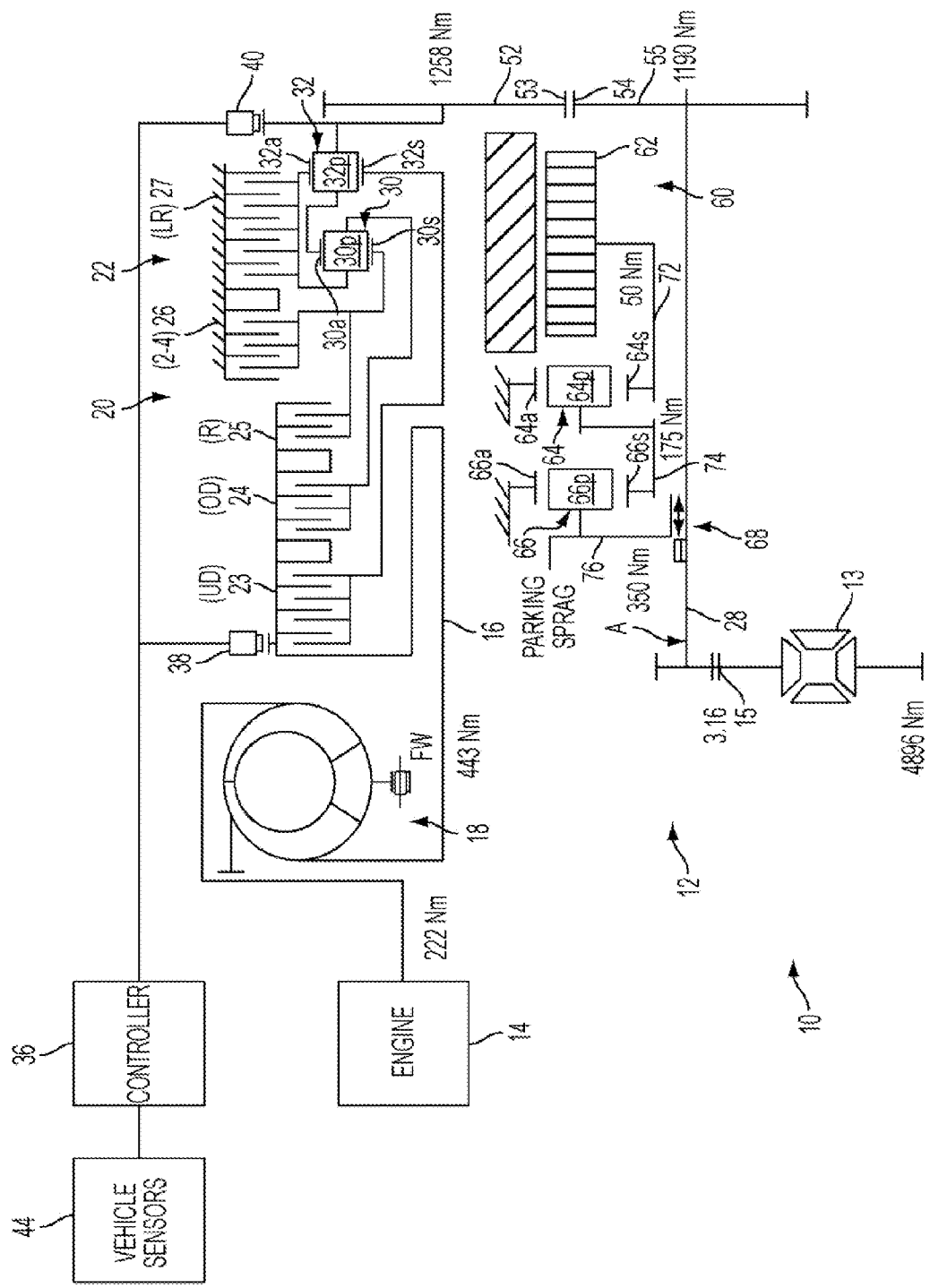
FIG. 1 illustrates a vehicle powertrain comprising a hybrid transmission according to the principles of the present disclosure.

FIG. 1 illustrates an example vehicle powertrain 10 including a hybrid automatic transmission 12 according to an embodiment described herein. The powertrain 10 also comprises a differential gear 13 operably connected to the transmission 12 through a gearset 15. The transmission 12 includes a torque converter 18 and an input shaft 16 operably connected to a gas combustible engine 14 via the torque converter 18. Torque is transferred from the engine 14 to the input shaft 16 through the torque converter 18.

The transmission 12 also includes a main box 20 having a main gearset 22 operably associated with the input shaft 16. The main box 20 may be the main box disclosed in U.S. Patent Application Publication 2008/0312022. The illustrated main gearset 22 includes first and second planetary gearsets 30, 32 having an identical number of teeth with respect to each other. The first planetary gearset 30 is a conventional planetary gearset as would be readily understood by one of ordinary skill in the art and includes an annulus gear 30a, at least one planetary gear 30p and a sun gear 30s. The second planetary gearset 32 is also a conventional planetary gearset and includes an annulus gear 32a, at least one planetary gear 32p and a sun gear 32s.

The main gearset 22 may also have a plurality of hydraulically-actuated engagement or shift elements. These shift elements may include three drive clutches 23, 24, 25, and two brake clutches 26, 27, which may be used to ground one or more gears of the planetary gearsets 30, 32 to the main box 20 housing. The first drive clutch 23 is often referred to as an underdrive (UD) clutch. The second drive clutch 24 is often referred to as an overdrive (OD) clutch. The third drive clutch 25 is often referred to as a reverse (R) clutch. The first brake clutch 26 is often referred to as 2-4 (2-4) clutch. The second brake clutch 27 is often referred to as low-reverse (LR) clutch.

The vehicle may also include a controller 36 in operable communication with the transmission 12. Although not shown, the transmission 12 could also include a pump operably associated with the controller 36 and a plurality of lines communicated from the pump to the drive and/or braking clutches 23, 24, 25, 26, 27. Other components associated with a conventional transmission may also be included (e.g., transducer, solenoid, etc.), but are not shown or described as they are not necessary to understand the inventive features of the illustrated embodiment. The controller 36 is connected to receive signals generated by an input shaft speed sensor 38, a transfer speed sensor 40 that monitors a speed of rotation of an output of the main gearset 22, and vehicle sensors 44 that monitor other vehicle operating information including vehicle speed and operator input, such as braking and accelerator pedal position. The controller 36 may also be connected to an output shaft speed sensor (not shown), if desired.

It should be appreciated that the controller 36 can selectively activate the drive and/or braking clutches 23, 24, 25, 26, 27 in any manner. One particular control scheme is illustrated in FIG. 2 and is discussed below in more detail. As is disclosed in U.S. Patent Application Publication 2008/0312022, the controller 36 may apply a given clutch 23, 24, 25, 26, 27 by supplying a signal (e.g., a pulse-width modulated energizing signal) to a solenoid-operated hydraulic fluid supply valve, which in turn controls the amount of torque that can be carried by a given one of the clutches 23, 24, 25, 26, 27. It will be appreciated that the controller chooses the proper gear depending on vehicle conditions such as the shift-program selected by the driver (i.e., Drive, Reverse, Neutral, etc.), the accelerator position, the engine condition, and the vehicle speed. It should also be appreciated that the transmission 12 can have any suitable configuration of shift elements, such as drive clutches and brake clutches, to define the main gearset 22 and selectively achieve a plurality of desired gear ratios with which to drive an output shaft 28 of the transmission.

The main gearset 22 is connected to the output shaft 28 via gear shaft 52, helical output gear 53, transfer gear 54 and transfer shaft 55. The helical output gear 53 and transfer gear 54 are continuously meshed with each other.

To further improve vehicle performance under certain circumstances (e.g., high boost in low gear) and to increase fuel economy, an electric drive unit 60 may be coupled to the output shaft 28 to form a hybrid electric/gas transmission. The electric drive unit 60 includes an electric motor 62, which can be a synchronous motor of 20 kW maximum power for 10 seconds and 10 kW continuous power. The field in the synchronous motor is turned off when the motor is not in use to prevent brake torque from reducing fuel economy. The motor 62 is connected, via shaft 72, to a first reduction stage comprising planetary gearset 64. Planetary gearset 64 is a conventional planetary gearset and includes an annulus gear 64a, at least one planetary gear 64p and a sun gear 64s. The sun gear 64s is connected to shaft 72, the annulus gear 64a is grounded and the planetary gear 64p is connected to a second reduction stage via shaft 74.

The second reduction stage comprises planetary gearset 66, which is a conventional planetary gearset and includes an annulus gear 66a, at least one planetary gear 66p and a sun gear 66s. The sun gear 66s is connected to shaft 74, the annulus gear 66a is grounded and the planetary gear 66p is connected to a high speed coupling device 68 via shaft 76. In FIG. 1, a high speed coupling device 68 is illustrated in an engaged position, whereby the output shaft 28 is engaged with shaft 76; in this configuration, the electric drive unit 60 contributes torque to the output shaft 28 as is described below in more detail. When the high speed coupling device 68 is in a disengaged position, the output shaft 28 is decoupled from shaft 76; in this configuration, the electric drive unit 60 does not contribute torque to the output shaft 28.

Referring also to FIG. 2, an example of how the controller 36 automatically controls the transmission 12 is now described. A first gear, having a gear ratio of 2.842 in this example, is achieved when the controller 36 applies the first drive clutch 23 (UD) and the second brake clutch 27 (LR). To switch from first to second gear, having a gear ratio of 1.573 in this example, the controller 36 applies the first brake clutch 26 (2-4) while releasing the second brake clutch 27 (LR) and maintaining the application of the first drive clutch 23 (UD). To switch from second to third gear, having a gear ratio of 1.000 in this example, the controller 36 applies the second drive clutch 24 (OD) while releasing the first brake clutch 26 (2-4) and maintaining the application of the first drive clutch 23 (UD). To switch from third to fourth gear, having a gear ratio of 0.689 in this example, the controller 36 releases the first drive clutch 23 (UD) and applies the first brake clutch 26 (2-4) while maintaining the application of the second drive clutch 24 (OD). To put the transmission in reverse, having a gear ration of −2.214, the controller 36 applies the third drive clutch 25 (R) and the second brake clutch 27 (LR).

In a gas mode of operation, the high speed coupling device 68 is disengaged, meaning only torque generated from the engine 14 is provided to the output shaft 28. It should be noted that the controller 36 can engage the high speed coupling device 68 to connect the output shaft 28 to shaft 76 to allow the electric drive unit 60 to contribute torque to the output shaft 28. This results in an electric/gas hybrid mode of operation. In the illustrated embodiment, the engagement of the high speed coupling device 68 will occur in low gear (i.e., gear 1 with ratio 2.842 as illustrated in FIG. 2) to provide a boost during this gear. In the illustrated example, power from the engine 14 to the differential 13 is distributed throughout the powertrain 10 as follows. There is 222 Nm output from the engine 14, which is applied to the torque converter 18. The torque on shaft 16 leaving the torque converter 18 is 443 Nm, which is applied through the main box 20. Torque on the gear shaft 52 is 1258 Nm, which becomes 1190 Nm at the transfer shaft 55 (due to the gearing of output gear 53 and transfer gear 54). In the electric drive unit 60, shaft 72 has a torque of 50 Nm, shaft 74 has a torque of 175 Nm and shaft 76 has a torque of 350 Nm. The torque contributions are summed at point A and multiplied by 3.16, which is the ratio of gearset 15. Final torque from the powertrain 10 is 4896 Nm.

The transmission 12 illustrated in FIG. 1 provides several advantages over conventional automatic transmissions. For example, in the electric/gas hybrid mode of operation, the illustrated embodiment combines the torque provided from the electric motor with the input torque maximized by the main box 20 main gearset 22. This combination provides a high boost when the transmission is in low gear. In addition, the electric motor 62 of the electric drive unit 60 increases fuel efficiency by about 15% to about 20% because electric power is being used in certain gears.

Figure 3:
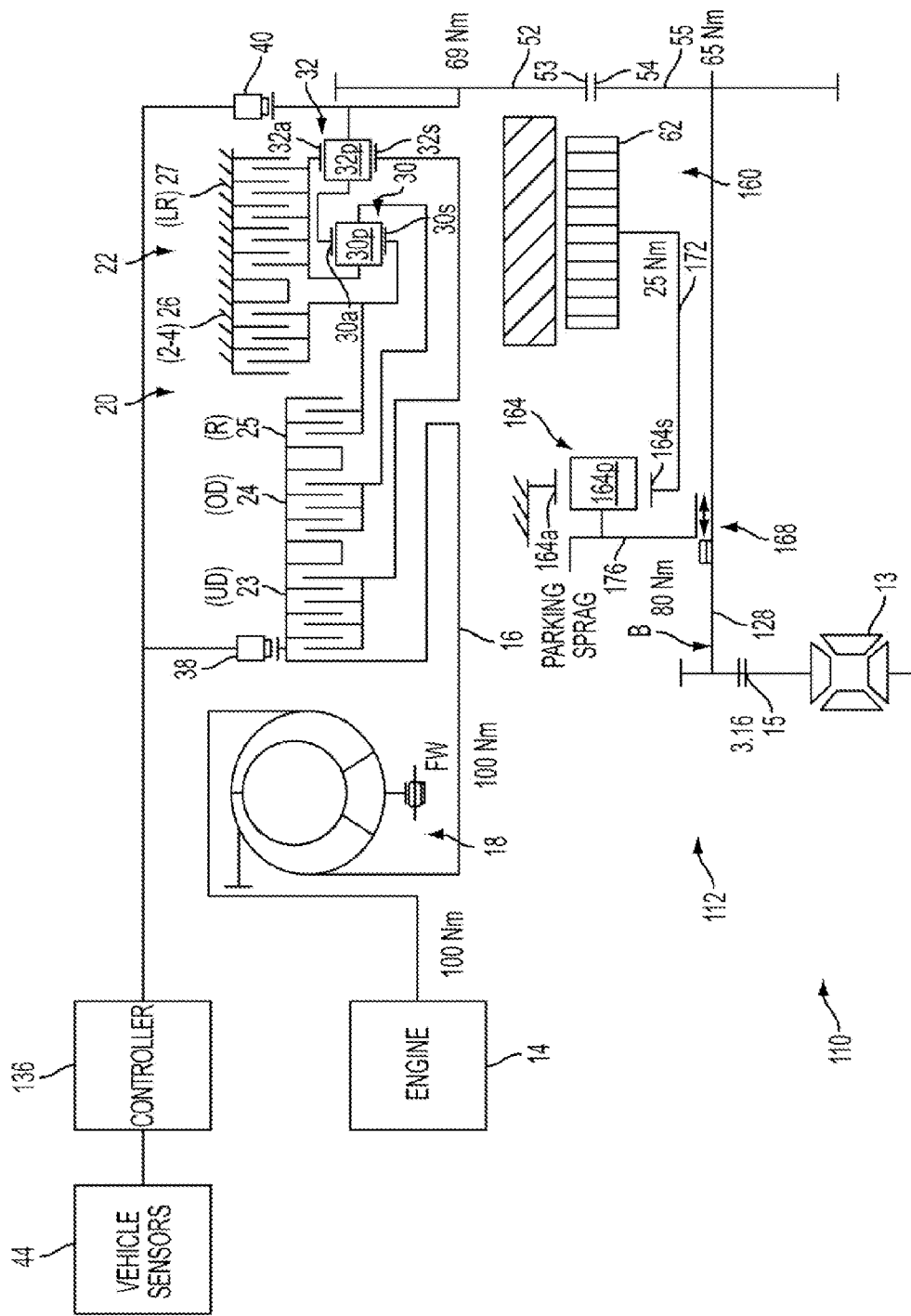
FIG. 3 illustrates a vehicle powertrain comprising a hybrid transmission according to the principles of the present disclosure.

FIG. 3 illustrates an example vehicle powertrain 110 including a hybrid automatic transmission 112 according to another embodiment described herein. Similar to the FIG. 1 powertrain 10, powertrain 110 also comprises a differential gear 13 operably connected to the hybrid automatic transmission 112. In the illustrated embodiment, powertrain 110 components such as the engine 14, input shaft 16, torque converter 18, main box 20, input shaft speed sensor 38, transfer speed sensor 40, and vehicle sensors 44 are substantially the same as the components contained in powertrain 10 (FIG. 1). Thus, a description of these components is not provided. The powertrain 110 includes a controller 136, which may be similar to controller 36 of powertrain 10 with the exception that the gearing of the illustrated embodiment is controlled as discussed below.

The main gearset 22 is connected to an output shaft 128 via a gear shaft 52, helical output gear 53, transfer gear 54 and transfer shaft 55. The helical output gear 53 and transfer gear 54 are continuously meshed with each other.

To further improve vehicle performance under certain circumstances (e.g., high boost in upper gears) and to increase fuel economy, an electric drive unit 160 is connected the output shaft 128 to form a hybrid electric/gas transmission according to the second embodiment. The electric drive unit 160 includes an electric motor 62, which can be a synchronous motor of 20 kW maximum power for 10 seconds and 10 kW continuous power. The field in the synchronous motor is turned off when the motor is not in use to prevent brake torque from reducing fuel economy. The motor 62 is connected to a reduction stage comprising planetary gearset 164 via shaft 172. Planetary gearset 164 is a conventional planetary gearset and includes an annulus gear 164a, at least one planetary gear 164p and a sun gear 164s. The sun gear 164s is connected to shaft 172, the annulus gear 164a is grounded and the planetary gear 164p is connected to a high speed coupling device 168 via shaft 176.

In FIG. 3, the high speed coupling device 168 is illustrated in an engaged position, whereby the output shaft 128 is engaged with shaft 176; in this configuration, the electric drive unit 160 contributes torque to the output shaft 128 as is described below in more detail. This is the hybrid electric/gas mode of operation. When the high speed coupling device 168 is in a disengaged position, the output shaft 128 is decoupled from shaft 176; in this configuration, the electric drive unit 160 does not contribute torque to the output shaft 128. This is the gas mode of operation.

It should be noted that the controller 136 can engage the high speed coupling device 168 to connect the output shaft 128 to shaft 176 to allow the electric drive unit 160 to contribute torque to the output shaft 128. In the illustrated embodiment, the engagement of the high speed coupling device 168 will occur in high gears (i.e., gears 3 and 4 with ratios 1.000 and 0.689, respectively, as illustrated in FIG. 2) to provide a boost during these gears. In the illustrated example, power from the engine 14 to the differential 13 is distributed throughout the powertrain 110 as follows. There is 100 Nm output from the engine 14, which is applied to the torque converter 18. Because the torque converter is locked up in this embodiment, the torque on shaft 16 leaving the torque converter 18 is 100 Nm, which is applied through the main box 20. Torque on the gear shaft 52 is 69 Nm, which becomes 65 Nm at the transfer shaft 55 (due to the gearing of output gear 53 and transfer gear 54). In the electric drive unit 160, shaft 172 has a torque of 25 Nm and shaft 176 has a torque of 80 Nm. The torque contributions are summed at point B and multiplied by 3.16, which is the ratio of gearset 15. Final torque from the powertrain 110 is 551 Nm.

The FIG. 3 transmission 112 provides several advantages over conventional automatic transmissions. For example, in the hybrid electric/gas mode, the illustrated embodiment combines the torque provided from an electric motor with the input torque provided by the main box 20 main gearset 22. This combination provides a high boost when the transmission is in higher gears. In addition, the electric motor 162 of the electric drive unit 160 increases fuel efficiency by about 15% to 20% because electric power is being used in certain gears.

Figure 4:
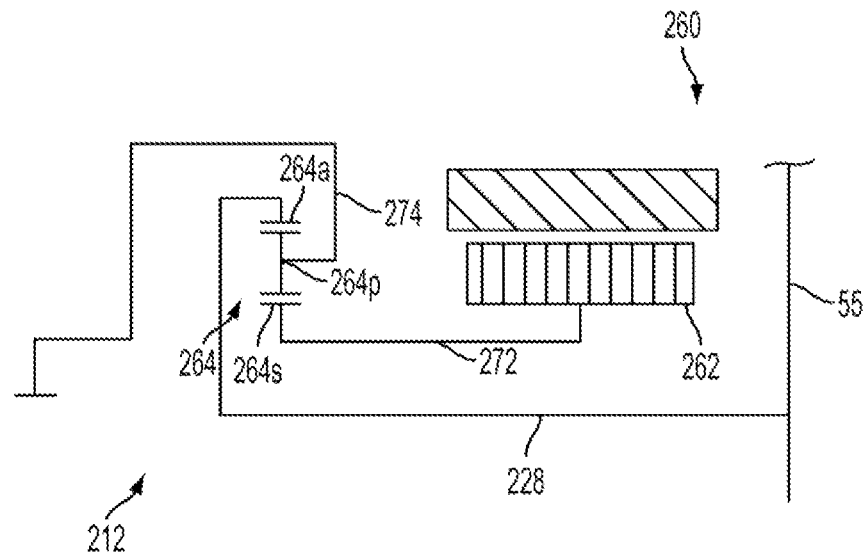
FIG. 4 illustrates a portion of a vehicle hybrid transmission according to the principles of the present disclosure.

FIG. 4 illustrates a portion of a vehicle hybrid transmission 212 in accordance with another embodiment disclosed herein. The transmission 212 includes and electric drive unit 260 connected to an output shaft 228. Output shaft 228 is connected to a transfer shaft 55. Although not shown, a coupling device is also included to selectably couple an electric motor 262 of the electric drive unit 260 to the output shaft 228 when a controller determines that it is beneficial to do so. It should be noted that the other portions of a vehicle powertrain would also be included (such as e.g., differential gear 13, engine 14, gearset 15, input shaft 16, torque converter 18, main box 20, controller 36/136, and sensors 36, 38, 40), but are not shown or described for convenience purposes.

In the illustrated embodiment, the electric motor 262 is connected, via shaft 272, to a reduction stage comprising planetary gearset 264. Planetary gearset 264 is a conventional planetary gearset and includes an annulus gear 264a, at least one planetary gear 264p and a sun gear 264s. The sun gear 264s is connected to the motor 262 via shaft 272, the annulus gear 264a is connected to output shaft 228 and the planetary gear 264p is connected to a shaft 274, which is connected to the differential gear (not shown).

Figure 5:
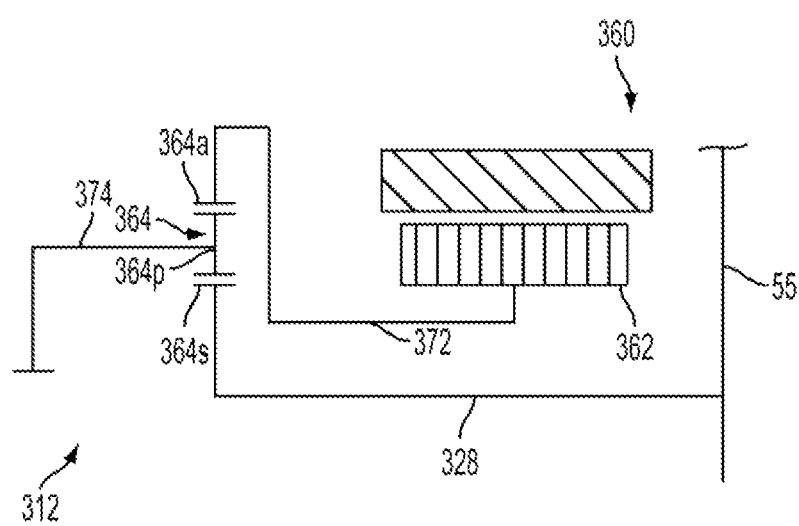
FIG. 5 illustrates a portion of a vehicle hybrid transmission according to the principles of the present disclosure.

FIG. 5 illustrates a portion of a vehicle hybrid transmission 312 in accordance with another embodiment disclosed herein. The transmission 312 includes and electric drive unit 360 connected to an output shaft 328. Output shaft 328 is connected to a transfer shaft 55. Although not shown, a coupling device is also included to selectably couple an electric motor 362 of the electric drive unit 360 to the output shaft 328 when a controller determines that it is beneficial to do so. It should be noted that the other portions of a vehicle powertrain would also be included (such as e.g., differential gear 13, engine 14, gearset 15, input shaft 16, torque converter 18, main box 20, controller 36/136, and sensors 36, 38, 40), but are not shown or described for convenience purposes.

In the illustrated embodiment, the electric motor 362 is connected, via shaft 372, to a reduction stage comprising planetary gearset 364. Planetary gearset 364 is a conventional planetary gearset and includes an annulus gear 364a, at least one planetary gear 364p and a sun gear 364s. The sun gear 364s is connected to output shaft 328, the annulus gear 364a is connected to the motor 362 via shaft 372 and the planetary gear 364p is connected to a shaft 374, which is connected to the differential gear (not shown).

Figure 6:
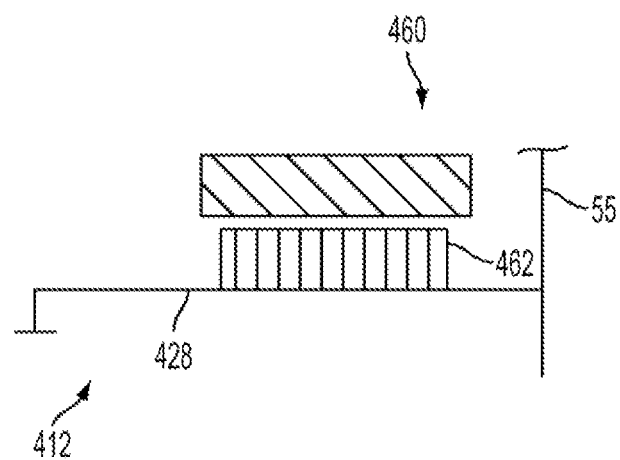
FIG. 6 illustrates a portion of a vehicle hybrid transmission according to the principles of the present disclosure.

FIG. 6 illustrates a portion of a vehicle hybrid transmission 412 in accordance with another embodiment disclosed herein. The transmission 412 includes and electric drive unit 460 connected to an output shaft 428. Output shaft 428 is connected to a transfer shaft 55. Although not shown, a coupling device is also included to selectably couple an electric motor 462 of the electric drive unit 460 to the output shaft 428 when a controller determines that it is beneficial to do so. It should be noted that the other portions of a vehicle powertrain would also be included (such as e.g., differential gear 13, engine 14, gearset 15, input shaft 16, torque converter 18, main box 20, controller 36/136, and sensors 36, 38, 40), but are not shown or described for convenience purposes. In the illustrated embodiment, the electric motor 462 is directly connected to the output shaft (when the coupling device is engaged). There is no reduction gearset in this embodiment. Output shaft 428 is connected to the differential gear (not shown).

It should be appreciated that the electric motors 62, 262, 362, 462 can be any electric motor desirable to achieve boost in low gears or desirable to achieve a boost during high gears. All that would be required is for the controller to be programmed/setup appropriately for the motor used and the desired boost scenario.

What is claimed is:

1. A hybrid transmission comprising:
a main gearset connected to an engine via an input shaft, said main gearset comprising a plurality of planetary gears and a plurality of shift elements configured to provide torque to an output shaft;
an electric drive unit selectably coupled to the output shaft to provide additional torque to the output shaft, the electric drive unit comprising:
an electric motor;
a coupling device connected to the output shaft;
a first gearset coupled to the electric motor; and
a second gearset coupled to the first gearset and further coupled to the coupling device; and
a controller operably associated with the main gearset and the electric drive unit to cause the transmission to transfer the torque in a first mode of operation and to couple the electric drive unit to the output shaft to transfer the torque plus the additional torque in a second mode of operation.

2. The transmission of claim 1, wherein the first mode of operation is a gas mode.

3. The transmission of claim 2, wherein the second mode of operation is a hybrid electric/gas mode.

4. The transmission of claim 1, wherein the electric motor is coupled to the output shaft through the first gearset and the second gearset.

5. The transmission of claim 1, wherein
the first gearset comprises a first sun gear, a first planetary gear and a first annulus gear, the first sun gear being coupled to the electric motor, and
wherein the second gearset comprises a second sun gear, a second planetary gear and a second annulus gear, the second sun gear being coupled to the first planetary gear of the first gearset, and the second planetary gear being coupled to the coupling device.

6. The transmission of claim 5, wherein the controller couples the electric drive unit to the output shaft when the main gearset is in a low gear.

7. The transmission of claim 1, wherein
the first gearset comprises a first sun gear, first planetary gear and a first annulus gear, the first sun gear being coupled to the electric motor and the first planetary gear being coupled to the second gearset.

8. The transmission of claim 7, wherein the controller couples the electric drive unit to the output shaft when the main gearset is in a high gear.

9. The transmission of claim 1, wherein
the first gearset comprises a first sun gear, a first planetary gear and a first annulus gear, the first sun gear being coupled to the electric motor and the first annulus gear being coupled to the second gearset.

10. The transmission of claim 1, wherein
the first gearset comprises a first sun gear, a first planetary gear and a first annulus gear, the first annulus gear being coupled to the motor and the first sun gear being coupled to the second gearset.

11. A vehicle powertrain comprising:
a gas combustible engine; and
a transmission connected to the engine via an input shaft, wherein said transmission comprises:
a main gearset connected to the engine via the input shaft, said main gearset comprises a plurality of planetary gears and a plurality of shift elements configured to provide torque to an output shaft,
an electric drive unit selectably coupled to the output shaft to provide additional torque to the output shaft, the electric drive unit comprising:
an electric motor
a coupling device connected to the output shaft,
a first gearset coupled to the electric motor, and
a second gearset coupled to the first gearset, and further coupled to to the coupling device, and
a controller operably associated with the main gearset and the electric drive unit to cause the transmission to transfer the torque in a first mode of operation and to couple the electric drive unit to the output shaft to transfer the torque plus the additional torque in a second mode of operation.

12. The powertrain of claim 11, wherein the first mode of operation is a gas mode and the second mode of operation is a hybrid electric/gas mode.

13. The powertrain of claim 11, wherein the electric motor is coupled to the output shaft through the first gearset and the second gearset.

14. The powertrain of claim 11, wherein
the first gearset comprises a first sun gear, first planetary gear and a first annulus gear, the first sun gear being coupled to the electric motor; and
wherein the second gearset comprises a second sun gear, second planetary gear and a second annulus gear, the second sun gear being co pled to the first planetary gear of the first gearset, and the second planetary gear being coupled to e coupling device.

15. The powertrain of claim 14, wherein the controller couples the electric drive unit to the output shaft when the main gearset is a low gear.

16. The powertrain of claim 11, wherein
the first gearset comprises comprising a first sun ear, a first planetary gear and a first annulus gear, the first sun gear being coupled to the electric motor and the first planetary gear being coupled to the second gearset.

17. The powertrain of claim 16, wherein the controller couples the electric drive unit to the output shaft when the main gearset is i a high gear.

* * * * *